Nov. 19, 1935.  C. H. DAVIS  2,021,226
BEDPAN
Filed April 11, 1934
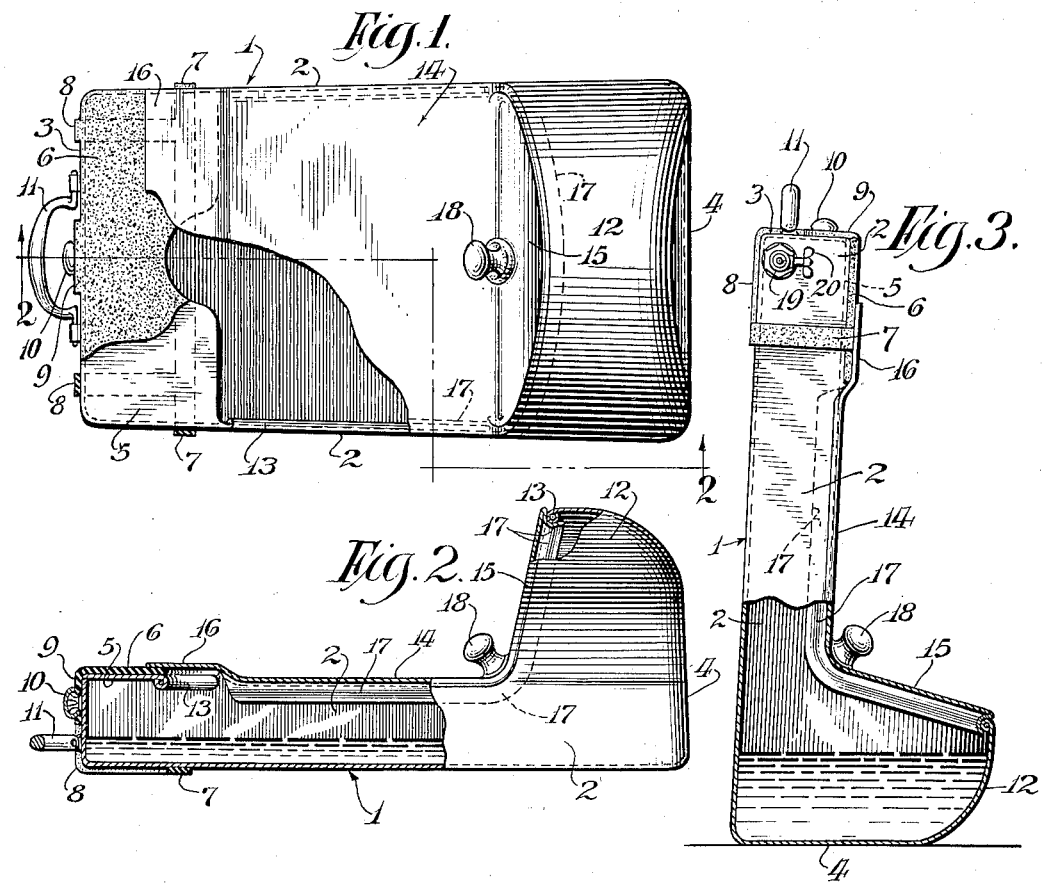
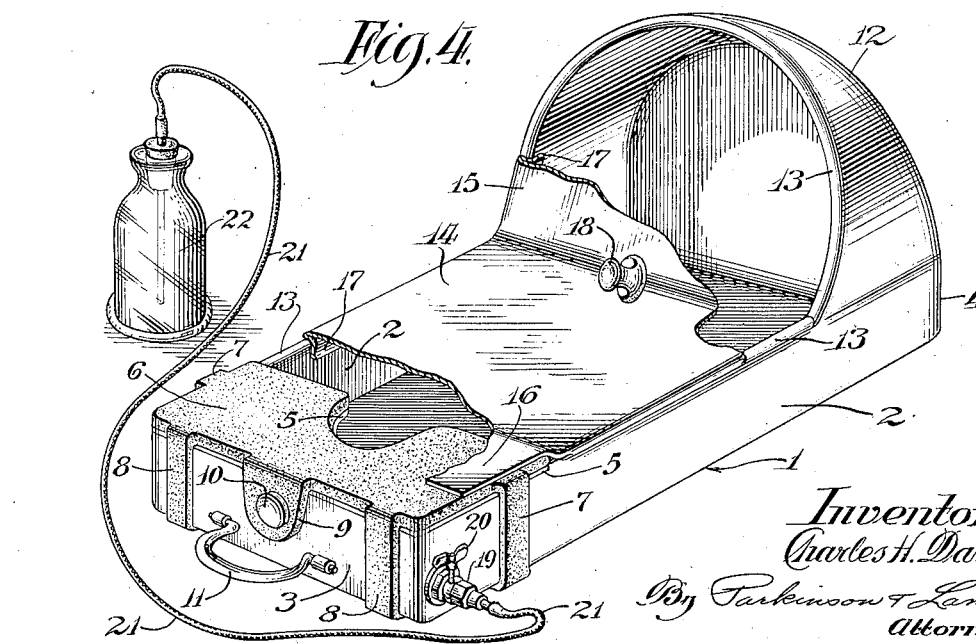
Inventor:
Charles H. Davis,
By Parkinson & Lane
Attorneys Patented Nov. 19, 1935

2,021,226

UNITED STATES PATENT OFFICE 2,021,226

BEDPAN

Charles Henry Davis, Winnetka, Ill.

Application April 11, 1934, Serial No. 720,013

2 Claims. (Cl. 4—112)

The present invention relates to bed pans and more particularly to a novel sanitary pan construction.

Among the objects of the present invention is to provide a bed pan of novel construction and design.

A further object of the invention is the provision of a completely sanitary bed pan provided with a readily detachable cover which forms a complete closure and protection when the pan is not in use.

Another object of the invention is the provision of a novel seat arrangement provided with a removable pad preferably formed of rubber or other suitable resilient and sanitary material.

A still further object of the present invention is the provision of a novel construction of pan which may be easily carried about or set on end when the same is not in use. The construction and formation of the pan is such as to add stability thereto when the same is set on end and thus prevent a tilting or tipping of the device.

Yet another object of the invention is the provision of a pan constructed of metal and which may be cheaply manufactured. The shape of the pan is such as to provide an enlarged opening to permit the same to be readily emptied and cleaned.

A further object of the invention is the provision of a novel construction and arrangement of seat upon which the patient or invalid is placed or seated. By having the seat of substantial size and covered with a rubber pad or the like, there is no discomfort to the patient or invalid.

A still further object is to provide a novel means for draining fluid from the pan whenever that becomes desirable.

Further objects are to provide a construction of maximum simplicity, efficiency, economy and ease of assembly, operation, repair and maintenance; and such further objects, advantages and capabilities as will later more fully appear, and as are inherently possessed thereby.

The invention further resides in the combination, construction and arrangements of parts illustrated in the accompanying drawing, and while there is shown therein a preferred embodiment, it is to be understood that the same is susceptible of modification and change and comprehends other details, arrangements of parts, features and constructions, without departing from the spirit of the invention.

In the drawing:

Fig. 1 is a top plan view of the novel pan with a portion of the cover and seat cushion broken away;

Fig. 2 is a view, part in vertical cross section, and part in side elevation, taken on the irregular line 2—2 of Fig. 1;

Fig. 3 is a view in side elevation with a portion thereof broken away, showing the pan in an upright position in which position it may be placed or carried;

Fig. 4 is a view in perspective of the pan with portions of the cover broken away to more adequately disclose the interior.

Referring more particularly to the disclosure in the drawing, the novel pan construction comprises a receptacle or container 1 having opposite side walls 2, and end walls 3 and 4. Adjacent the end wall 3 is mounted a plate 5 adapted to span the opposite side walls and be connected thereto and to the end 3 in any suitable manner, as by welding or the like. This plate 5 forms a seat upon which the patient or invalid is placed. A cushion 6 formed of rubber or other resilient material having similar properties is removably mounted upon the seat 5 and retained thereon by means of straps 7 and 8 which encompass the receptacle or container, and a cap 9 having a suitable fastener 10. A handle 11 is also connected to the end walls 3, and this handle may be made rigid thereon or suitably swivelled so as to fold down upon the end walls.

The end wall 4 merges into a rounded hood 12 forming an enlargement at the end opposite the seat. In order to prevent injury or discomfort to the patient or invalid, the free edges of the pan are rolled or provided with a bead, as at 13.

The cover 14 is adapted to completely close the pan or receptacle to the outside atmosphere. This cover is so shaped as to provide an inclined portion 15 adapted to enclose the hood 12 and a raised portion 16 adapted to seat over and cover a portion of the seat. In order to retain the cover or closure in position, the same is provided with a peripheral flange 17 bent inwardly and at its edge outwardly so as to ride over the bed 13 and to be retained thereon by a tensional or frictional grip. Thus the cover cannot be accidentally displaced but must depend upon manual removal or replacement, which is accomplished by means of a knob or handle 18.

Because of the size, construction and design of the pan, it provides a perfect protection to bed linen, especially when giving vaginal or rectal irrigations. As it is open for the greater portion of its length and is rounded at its corners, the construction is easy to clean and permits complete sterilization. The cushion pad being removable permits the same also to be thoroughly cleaned and sterilized. In its preferred form, the pan may be made of any suitable metal, which may be covered with enamel, if desired, although it may be constructed or formed of any material suitable for the purpose.

When the patient or invalid is placed upon the seat, the pan will tilt slightly so as to raise the end provided with hood. This will cause the fluid to flow towards the end containing the seat. Where several irrigations are necessary, or where the fluid content is of considerable volume, it may be found desirable to drain off a part of this fluid. The invention therefore comprehends the provision of a drain at the end adjacent the seat. This is more clearly disclosed in Fig. 4 in which a side wall 2 is provided with a coupling 19 having a valve or pet-cock 20 to an end of which may be attached a drain hose 21 leading to any suitable receptacle 22. The hose and receptacle are readily detached as is also the valve or pet-cock 20, the opening in the side walls of the receptacle being then closed by a removable plug.

From the above description and the disclosure in the drawing, it will be readily understood and appreciated that the invention comprehends a unique construction of bed pan which is completely sanitary and which may be readily and easily carried without danger of spilling the contents. As shown in Fig. 3, when the pan is being carried or not in use, the hood 12 forms the lower portion of the pan and the contents thereof will collect in this hood. Also when the pan is stood on end or carried as shown in Fig. 3, the base 1 and side walls 2 of the receptacle are positioned at an angle to the vertical so as to add stability to the pan and prevent tipping thereof. It will be apparent from the disclosure and especially Fig. 4 of the drawing, that the pan with its hood and the large opening, are amply sufficient for the needs of a patient or invalid, and because of such adequate size, such patient is more at ease than with the prior constructions now being employed. Also by reason of the cushion or rubber pad, the pan is made more comfortable.

Having thus disclosed the invention, I claim:

1. A sanitary bed pan consisting of an open container provided with a seat at one end and an enlarged hood at the other, the top of said container and a side of said hood being completely open to permit a ready and complete cleansing and sterilization of the pan and said hood affording complete protection to the bed linens, and a removable closure for said pan adapted to tightly and frictionally engage the sides of said container and hood to tightly seal the interior of the pan to the atmosphere.

2. A sanitary bed pan construction comprising a body part open throughout the greater portion of its length, a seat adjacent one end and an upstanding hood adjacent the other end of said body part, a readily removable closure for sealing the body part and hood to the atmosphere and retained thereon by a tight frictional engagement with the side walls of the body part and hood, and a handle at said seat end for carrying the pan in an upright position in which the contents collect in said hood.

CHARLES HENRY DAVIS.